(12) United States Patent
Cui (10) Patent No.: US 8,760,661 B2
(45) Date of Patent: Jun. 24, 2014

(54) METHOD AND APPARATUS FOR COMPRESSING ULTRASHORT OPTICAL PULSES

(75) Inventor: Meng Cui, Ashburn, VA (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 166 days.

(21) Appl. No.: 13/463,384

(22) Filed: May 3, 2012

(65) Prior Publication Data

US 2013/0114630 A1    May 9, 2013

Related U.S. Application Data

(60) Provisional application No. 61/482,147, filed on May 3, 2011.

(51) Int. Cl.
    *G01J 3/45*      (2006.01)
(52) U.S. Cl.
    USPC .......................................... 356/451; 356/450
(58) Field of Classification Search
    USPC ............. 356/73.1, 450–521, 425; 372/21, 25; 398/81, 141, 147, 149, 158, 159, 209; 385/11, 24, 27, 123
    See application file for complete search history.

(56) References Cited

U.S. PATENT DOCUMENTS

| | | | |
|---|---|---|---|
| 6,621,613 B2* | 9/2003 | Silberberg et al. | 359/239 |
| 7,092,414 B2 | 8/2006 | Piche et al. | |
| 7,230,715 B2 | 6/2007 | Li | |
| 7,450,618 B2 | 11/2008 | Dantus et al. | |
| 7,567,596 B2 | 7/2009 | Dantus et al. | |
| 7,576,907 B1 | 8/2009 | Bartels et al. | |
| 7,583,710 B2 | 9/2009 | Dantus et al. | |
| 7,609,731 B2 | 10/2009 | Dantus et al. | |
| 2002/0044328 A1* | 4/2002 | Silberberg et al. | 359/239 |
| 2003/0099264 A1* | 5/2003 | Dantus et al. | 372/25 |
| 2006/0033923 A1* | 2/2006 | Hirasawa et al. | 356/450 |
| 2006/0119855 A1* | 6/2006 | Li | 356/450 |
| 2006/0187974 A1 | 8/2006 | Dantus | |
| 2009/0257464 A1 | 10/2009 | Dantus et al. | |
| 2012/0049092 A1* | 3/2012 | Tu et al. | 250/504 R |

OTHER PUBLICATIONS

Ian A. Walmsley and Victor Wong, "Characterization of the electric field of ultrashort optical pulses," J. Opt. Soc. Am. B vol. 13, No. 11, pp. 2453-2463 (Nov. 1996).

(Continued)

*Primary Examiner* — Tarifur Chowdhury
*Assistant Examiner* — Michael P Lapage
(74) *Attorney, Agent, or Firm* — DiBerardino McGovern IP Group LLC (57) ABSTRACT

An apparatus includes a spatial light modulator configured to receive an optical pulse train; and output a modulated optical pulse train; a non-linear optical system that receives the modulated optical pulse train and generates a non-linear optical signal; and a power detector that detects a power of the generated non-linear optical signal. A control system outputs a signal to the spatial light modulator to cause it to modulate the optical pulse train by modulating the spectral phase of the optical pulse at wavelengths within a current wavelength range subset and maintain the spectral phase of the optical pulse constant at wavelengths outside the current wavelength range subset; and based on the detected power, extracts values of the spectral phase for the optical pulse at wavelengths within the current wavelength range subset, the values extracted being those that compress the optical pulses.

22 Claims, 10 Drawing Sheets

(56) References Cited

OTHER PUBLICATIONS

K. C. Chu, J. P. Heritage, R. S. Grant, K. X. Liu, A. Dienes, W. E. White, and A. Sullivan, "Direct measurement of the spectral phase of femtosecond pulses," Opt. Lett. vol. 20, No. 8, pp. 904-906 (Apr. 15, 1995).

C. Iaconis and I. A. Walmsley, "Spectral phase interferometry for direct electric-field reconstruction of ultrashort optical pulses", Opt. Lett. vol. 23, No. 10, pp. 792-794 (May 15, 1998).

J. P. Heritage et al., "Picosecond pulse shaping by spectral phase and amplitude manipulation", Opt. Lett. vol. 10, No. 12, pp. 609-611 (Dec. 1985).

M. Dantus, V. V. Lozovoy, and I. Pastirk, "Measurement and Repair: Analogous to a femtosecond Wheatstone Bridge, the MIIPS system can perform pulse characterization and compensation rapidly and efficiently." SPIE's OE Magazine 9, pp. 15-17 (Sep. 2003).

Vadim V. Lozovoy, I. Pastirk, and M. Dantus, "Multiphoton intrapulse interference. IV. Ultrashort laser pulse spectral phase characterization and compensation" Optics Letters vol. 29, No. 7, 775-777 (Apr. 1, 2004).

Bingwei Xu, et al., "Quantitative investigation of the multiphoton intrapulse interference phase scan method for simultaneous phase measurement and compensation of femtosecond laser pulses," J. Optical Society of America B, vol. 23, 750-759 (Apr. 2006).

D. Ahmasi Harris, Janelle C. Shane, Vadim V. Lozovoy, and Marcos Dantus, "Automated phase characterization and adaptive pulse compression using multiphoton intrapulse interference phase scan in air," Feb. 19, 2007 / vol. 15, No. 4 / Optics Express 1938.

A.M. Weiner, "Femtosecond Optical Pulse Shaping and Processing," Prog. Quant. Electr. 1995, vol. 19, pp. 161-237.

Vadim V. Lozovoy, et al., "Systematic Control of Nonlinear Optical Processes Using Optimally Shaped Femtosecond Pulses," ChemPhysChem 6, 1970-2000 (2005).

Jennifer P. Ogilvie, et al., "Use of coherent control for selective two-photon fluorescence microscopy in live organisms," Opt. Express 14, 759-766 (2006).

Daniel J. Kane, et al., "Characterization of arbitrary femtosecond pulses using frequency-resolved optical gating," IEEE J. Quantum Elect. vol. 29, No. 2, 571-579 (Feb. 1993).

Daniel J. Kane, et al., "Single-shot measurement of the intensity and phase of an arbitrary ultrashort pulse by using frequency-resolved optical gating," Opt. Lett. vol. 18, No. 10, 823-825 (May 15, 1993).

Rick Trebino, et al., "Using phase retrieval to measure the intensity and phase of ultrashort pulses: frequency-resolved optical gating," Journal of the Optical Society of America A-Optics Image Science and Vision, vol. 10, No. 5, 1101-1111 (May, 1993).

Rick Trebino, et al., "Measuring ultrashort laser pulses in the time-frequency domain using frequency-resolved optical gating," Review of Scientific Instruments 68, 3277-3295 (Sep. 1997).

Chris Iaconis, et al., "Self-referencing spectral interferometry for measuring ultrashort optical pulses," IEEE J. Quantum Elect. vol. 35, No. 4, 501-509 (Apr. 1999).

Vadim V. Lozovoy, et al., "Multiphoton intrapulse interference. II. Control of two- and three-photon laser induced fluorescence with shaped pulses," Journal of Chemical Physics, vol. 118, No. 7, 3187-3196 (Feb. 15, 2003).

W.B. Bridges, et al., "Coherent optical adaptive techniques," Appl. Optics vol. 13, No. 2, 291-300 (Feb. 1974).

J.-E. Pearson, et al., "Coherent optical adaptive techniques: design and performance of an 18-element visible multidither Coat system," Appl. Optics vol. 15, No. 3, 611-621 (Mar. 1976).

M. Cui, "Parallel wavefront optimization method for focusing light through random scattering media," Opt. Lett. vol. 36, No. 6, 870-872 (Mar. 15, 2011).

D. Yelin, et al., "Adaptive femtosecond pulse compression," Opt. Lett. vol. 22, No. 23, 1793-1795 (Dec. 1, 1997).

Erik Zeek, et al., "Pulse compression by use of deformable mirrors," Opt. Lett. vol. 24, No. 7, 493-495 (Apr. 1, 1999).

Erik Zeek, et al., "Adaptive pulse compression for transform-limited 15-fs high-energy pulse generation," Opt. Lett. vol. 25, No. 8, 587-589 (Apr. 15, 2000).

Michael R. Armstrong, et al., "Versatile 7-fs optical parametric pulse generation and compression by use of adaptive optics," Opt. Lett. vol. 26, No. 15, 1152-1154 (Aug. 1, 2001).

T. C. Weinacht, R. Bartels, S. Backus, P. H. Bucksbaum, B. Pearson, J. M. Geremia, H. Rabitz, H. C. Kapteyn, and M. M. Murnane, "Coherent learning control of vibrational motion in room temperature molecular gases," Chem. Phys. Lett. 344(3-4), 333-338 (Aug. 24, 2001).

R. Bartels, et al., "Shaped-pulse optimization of coherent emission of high-harmonic soft X-rays," Nature 406(6792), 164-166 (Jul. 13, 2000).

D. Meshulach, D. Yelin, and Y. Silberberg, "Adaptive ultrashort pulse compression and shaping," Opt. Commun. 138 (4-6), 345-348 (Jun. 1, 1997).

Anatoly Efimov, et al., "Adaptive control of pulse phase in a chirped-pulse amplifier," Opt. Lett. vol. 23, No. 24, 1915-1917 (Dec. 15, 1998).

\* cited by examiner

METHOD AND APPARATUS FOR COMPRESSING ULTRASHORT OPTICAL PULSES

CROSS-REFERENCE TO RELATED APPLICATION

This application claims priority to U.S. Application No. 61/482,147, filed on May 3, 2011 and entitled "Ultrafast Laser Pulse Measurement and Compensation," which is incorporated herein by reference in its entirety.

TECHNICAL FIELD

The disclosed subject matter relates to a method and system for measuring dispersion in an ultrafast laser pulses and compensating for the dispersion based on this measurement.

BACKGROUND

The electric field of an optical pulse can be described in the time domain or in the frequency domain. The spectral phase of an optical pulse is the phase of the electric field in the frequency domain. Ultrashort optical pulses are those optical pulses having durations of femtoseconds or picoseconds and high peak intensity. In ultrafast optics, an optical pulse is transform limited if it has a frequency-independent (and therefore wavelength-independent) spectral phase. For a given pulse duration, transform-limited pulses are those with the minimum possible temporal width. The pulse duration of ultrashort optical pulses can be sensitive to various effects, such as chromatic dispersion, nonlinearities, and optical filters.

SUMMARY

In one general aspect, a method is performed for compressing ultrashort optical pulses of a train, the optical pulses having a range of wavelengths. The method includes partitioning the wavelength range into a plurality of subsets of wavelength ranges; selecting one of the wavelength range subsets as the current wavelength range subset; modulating the optical pulse train based on the current wavelength range subset by maintaining the spectral phase of the optical pulse constant at wavelengths outside the current wavelength range subset, and modulating the spectral phase of the optical pulse at wavelengths within the current wavelength range subset; generating a non-linear optical signal from the modulated optical pulse train by directing the modulated optical pulse train through a non-linear optical system; measuring the power of the generated non-linear optical signal; and based on the measured power, extracting values of the spectral phase for the optical pulse at wavelengths within the current wavelength range subset, the values extracted being those that compress the optical pulses.

Implementations can include one or more of the following features. For example, the method can also include setting the spectral phase for the optical pulse at wavelengths within the current wavelength range subset based on the extracted vales of the spectral phase that compress the optical pulses. The method can also include determining whether the optical pulses have been compressed to within an acceptable range of the transform limited duration. The optical pulses can be compressed to within the acceptable range of the transform limited duration if the spectral phase is independent of the wavelength to within 5% of the wavelength.

The method can include, after setting the spectral phase for the optical pulse at wavelengths within the current wavelength range subset, determining if any of the wavelength ranges of the partition have not yet been selected as the current wavelength range subset. If a particular wavelength range subset of the partition has not yet been selected as the current wavelength range subset, then the particular wavelength range subset can be selected as the current wavelength range subset; the optical pulse train can be modulated based on the current wavelength range subset; the non-linear optical signal can be generated from the modulated optical pulse train by directing the modulated optical pulse train through the non-linear optical system; the power of the generated non-linear optical signal can be measured; and based on the measured power, values of the spectral phase for the optical pulse at wavelengths within the current wavelength range subset can be extracted, the values extracted being those that compress the optical pulses. The method can include setting the spectral phase for the optical pulse at wavelengths within the current wavelength range subset based on the extracted vales of the spectral phase that compress the optical pulses.

The modulated optical pulse train can be directed through the non-linear optical system by directing the modulated optical pulse train through a non-linear medium. The non-linear optical signal can be generated by generating a second harmonic generation of the modulated optical pulse train after it passes through the non-linear optical medium; and the power of the generated non-linear optical signal can be measured by measuring the power of the second harmonic generation.

The modulated optical pulse train can be directed through the non-linear optical system by directing the modulated optical pulse train through a multi-photon fluorescence microscope toward a sample. The non-linear optical signal can be generated from the modulated optical pulse train by generating multi-photon fluorescence from the sample due to a multi-photon interaction of the modulated optical pulse train with the sample; and the power of the generated non-linear optical signal can be measured by measuring the power of the multi-photon fluorescence.

The power of the generated non-linear optical signal can be measured by Fourier transforming the measured power; and values of the spectral phase for the optical pulse at wavelengths within the current wavelength range subset can be extracted by extracting the values of the spectral phase from the Fourier transformed data.

The values can be extracted by extracting the values without analyzing the spectrum of the generated non-linear optical signal.

The spectral phase of the optical pulse can be modulated at wavelengths within the current wavelength range subset by modulating the optical pulse at each wavelength within the current wavelength range subset at a distinct frequency.

The wavelength range can be partitioned into a plurality of subsets of wavelength ranges by partitioning the wavelength range into at least three subsets of wavelength ranges.

In another general aspect, an apparatus compresses ultrashort optical pulses of an optical pulse train, the optical pulses having a range of wavelengths. The apparatus includes a spatial light modulator configured to receive the optical pulse train; and output the modulated optical pulse train. The apparatus includes a non-linear optical system that receives the modulated optical pulse train output from the spatial light modulator and is configured to generate a non-linear optical signal from the modulated optical pulse train; and a power detector that detects a power of the generated non-linear optical signal. The apparatus also includes a control system connected to the spatial light modulator and to the power detector, and configured to partition the wavelength range of the optical pulse into a plurality of subsets of wavelength ranges; select a wavelength range subset from the partition as the current wavelength range subset; output a signal to the spatial light modulator to cause the spatial light modulator to modulate optical pulse train by modulating the spectral phase of the optical pulse at wavelengths within the current wavelength range subset and maintaining the spectral phase of the optical pulse constant at wavelengths outside the current wavelength range subset; receive the detected power from the power detector; and based on the measured power, extract values of the spectral phase for the optical pulse at wavelengths within the current wavelength range subset, the values extracted being those that compress the optical pulses.

Implementations can include one or more of the following features. For example, the control system can be configured to set the spectral phase for the optical pulse at wavelengths within the current wavelength range subset based on the extracted vales of the spectral phase that compress the optical pulses. The control system can be configured to determine whether the optical pulses have been compressed to the transform limited duration.

The non-linear optical system can include a non-linear medium. The generated non-linear optical signal can include the second harmonic generation signal generated from the non-linear medium.

The non-linear optical system can include a multi-photon fluorescence microscope. The generated non-linear optical signal can include the multi-photon fluorescence output from the sample due to a multi-photon interaction of the modulated optical pulse train with the sample.

In another general aspect, a method is used for compressing ultrashort optical pulses of an optical pulse train, the optical pulses having a range of wavelengths. The method includes partitioning the wavelength range into a plurality of subsets of wavelength ranges. For each wavelength range subset of the partition; A. the wavelength range subset is selected as a current wavelength range subset; B. the optical pulse train is modulated based on the current wavelength range subset by maintaining the spectral phase of the optical pulse constant at wavelengths outside the current wavelength range subset and modulating the spectral phase of the optical pulse at wavelengths within the current wavelength range subset; C. a non-linear optical signal is generated from the modulated optical pulse train by directing the modulated optical pulse train through a non-linear optical system; D. the power of the generated non-linear optical signal is measured; E. based on the measured power, values of the spectral phase for the optical pulse at wavelengths within the current wavelength range subset are extracted, the values extracted being those that compress the optical pulses; and F. the spectral phase for the optical pulse at wavelengths within the current wavelength range subset is set based on the extracted vales of the spectral phase that compress the optical pulses. Steps A-F are repeated until the optical pulses of the optical pulse train have been compressed to a duration that is within the acceptable range of the transform-limited duration.

DESCRIPTION

Figure 1:
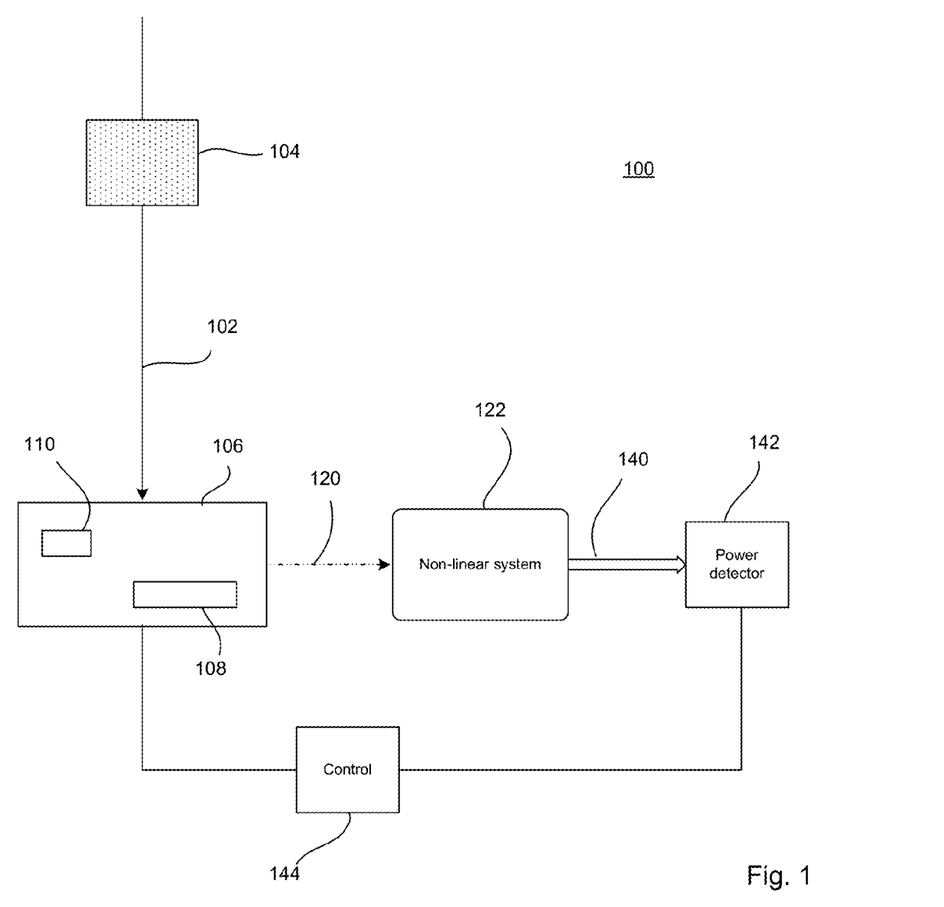
FIG. 1 is a block diagram of a parallel spectral phase modulation apparatus.

Referring to FIG. 1, an apparatus 100 is designed for compressing ultrashort optical pulses 102, in which the pulse duration of the optical pulses 102 has been broadened due to effects such as dispersion when the optical pulses 102 travel through dispersive media 104. The ultrashort optical pulses 102 are emitted as a pulse train from an ultrafast optical source (not shown in FIG. 1) such as an oscillator or laser at a pulse repetition rate. For example, the ultrafast optical source can offer repetition rates from 10 Hz to 300 kHz with pulse energies ranging from the μJ-level to 100 mJ. As a specific example, one suitable ultrafast optical source is a Ti:Sapphire (Ti:S) ultrafast oscillator that is Kerr Lens mode-locked to produce a broad range of pulse durations, wavelength ranges (for example, a 400 nm tuning range), and repetition rates (such as, for example, 80 MHz). Coherent Inc. makes ultrafast optical sources of this type, such as their Chameleon Ultra femtosecond oscillator.

The apparatus 100 uses a technique that can be referred to as parallel spectral phase modulation or phase resolved interferometric spectral modulation (PRISM), which is employed to quickly provide phase compensation of the optical pulses 102. PRISM requires no spectrum analysis or measurement of the nonlinear signals. Instead, the power of nonlinear signals is used to quickly measure the spectral phase and to compress the optical pulses 102. Moreover, parallel spectral phase modulation has been shown to work with both smooth and completely random distortions that are applied to the optical pulses 102. As discussed herein, the experimental results of the technique are also verified with multiphoton intrapulse interference phase scan (MIIPS) measurements.

PRISM uses a nonlinearity and a phase-only spatial light modulator in which each phase element is dithered at a unique frequency to form transform limited optical pulses. If the optical pulse is transform limited, its spectral phase can only be decomposed to $0^{th}$ order and $1^{st}$ order terms. Also, if the $0^{th}$ order and $1^{st}$ order spectral phase terms are zero (0) such that the spectral phase is flat and equal to zero, then with a 4f pulse shaper, the spectral phase at different wavelengths can be controlled. If one of the phase elements of the 4f pulse shaper is changed from 0 to π, the optical pulse becomes longer due to the non-constructive interference between the out of phase wavelength and all the rest of the wavelengths at the temporal peak position. If the optical pulse interacts with a non-linear medium and generates non-linear signals, then the non-linear signal strength is lower than if all the wavelengths are in phase. If the spectral phase of one of the wavelengths was originally φ out of phase with respect to all the rest of wavelength, then adding −φ to the out of phase wavelength with the 4f pulse shaper can increase the non-linear signal to the maximum value. By applying a continuous phase modulation and monitoring the non-linear signal variation, the spectral phase value of the out-of-phase element can be determined; which is the basic principle of PRISM. Although the physical picture becomes more complicated if the optical pulse is initially severely distorted, both experiments and simulations show that the apparatus and technique can indeed quickly determine the spectral phase profile of ultrafast optical pulses, regardless if the initial phase profile is smooth or even completely random.

The apparatus 100 includes a spatial light modulator system 106 that includes a spatial light modulator 108 and optics 110 that adjust characteristics (such as direction and dispersion) of the optical pulses 102 that are input to the spatial light modulator 108 and also adjusts characteristics of a modulated optical pulse train 120 that is output from the spatial light modulator 108.

Figure 2:
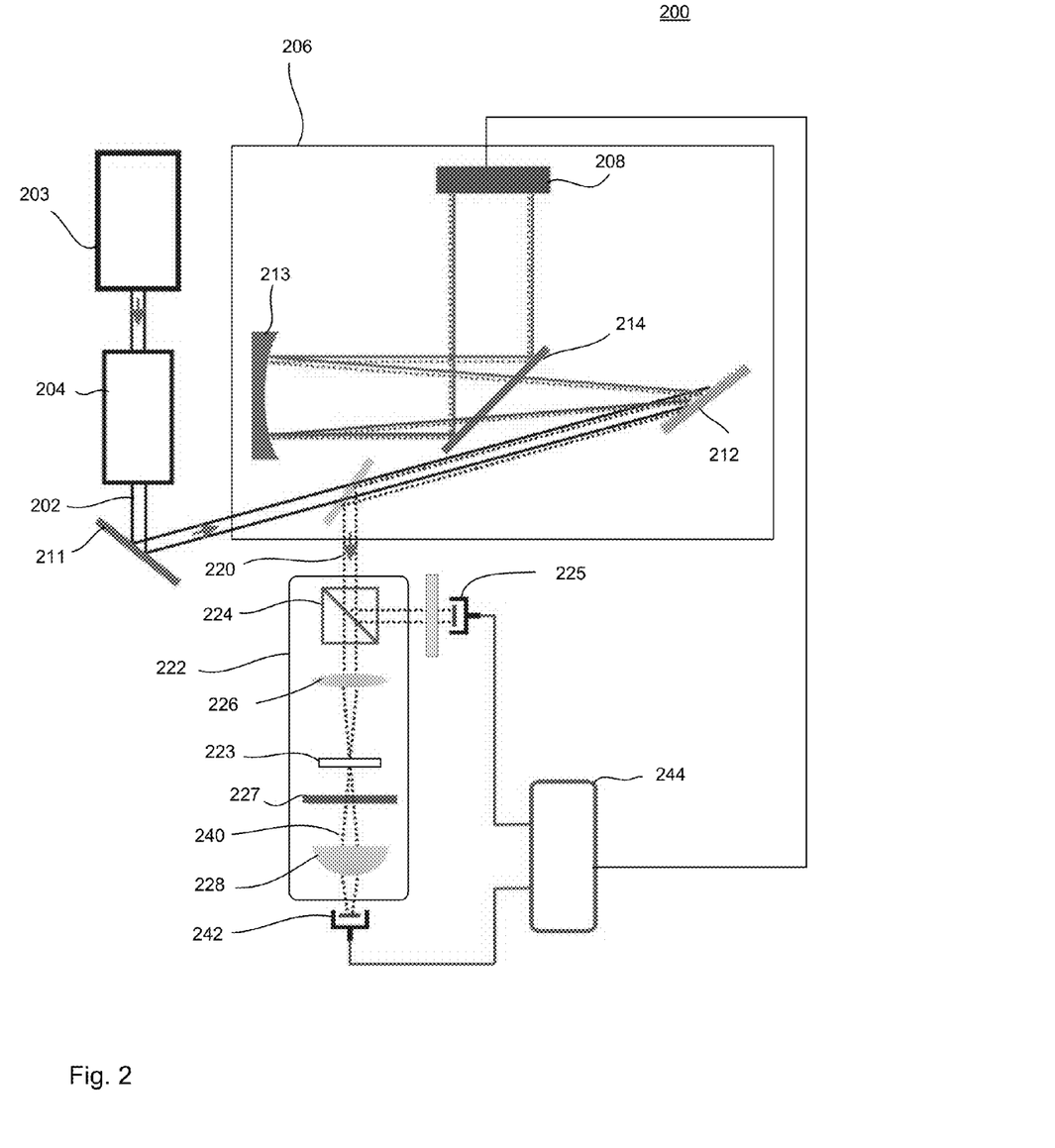
FIG. 2 is a block diagram of an exemplary parallel spectral phase modulation apparatus in which a non-linear optical system includes a device for producing a second harmonic generation signal.
Figure 3:
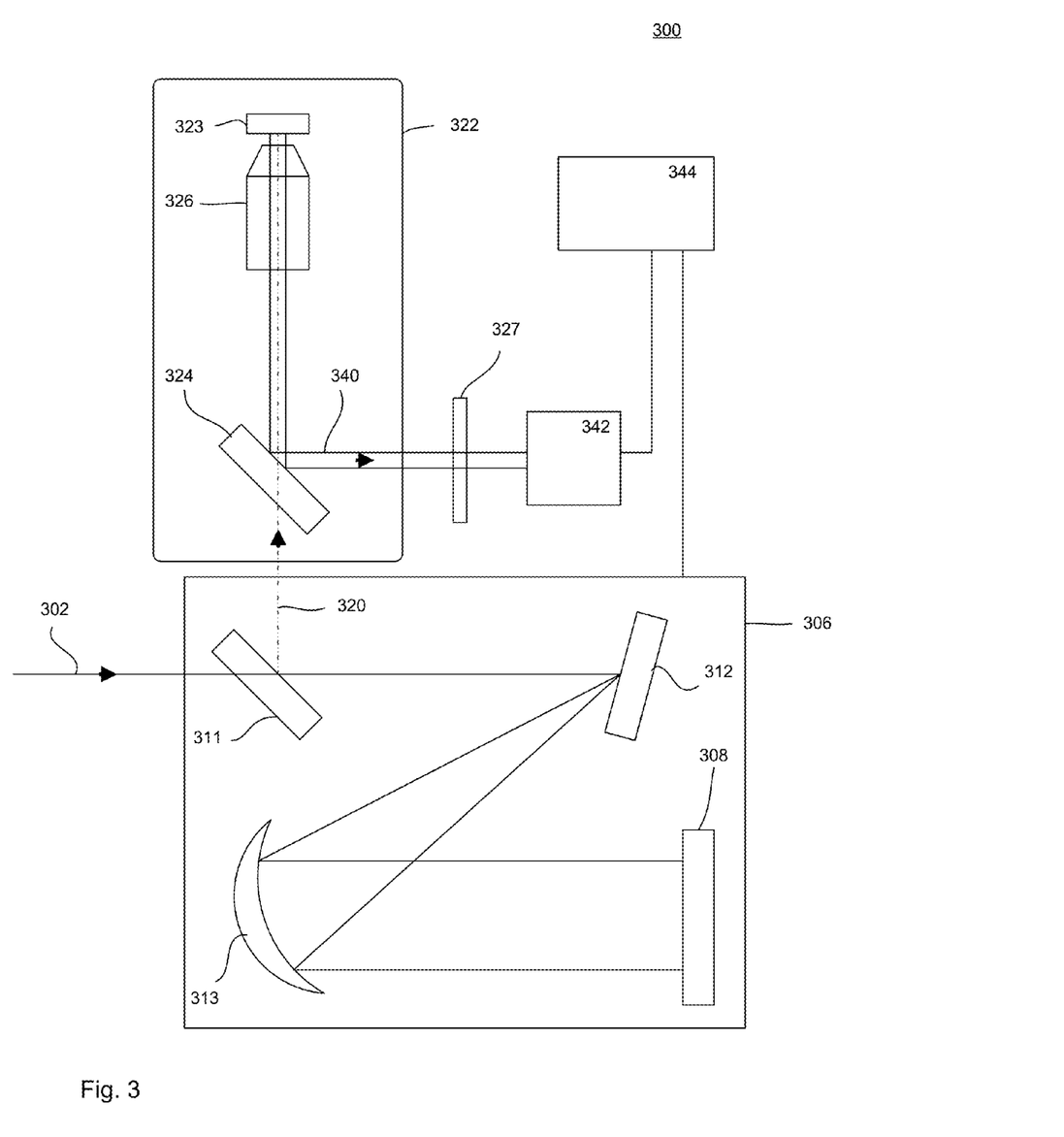
FIG. 3 is a block diagram of an exemplary parallel spectral phase modulation apparatus in which a non-linear optical system includes a multi-photon fluorescence microscope for producing an epi-fluorescence signal.
Figure 4:
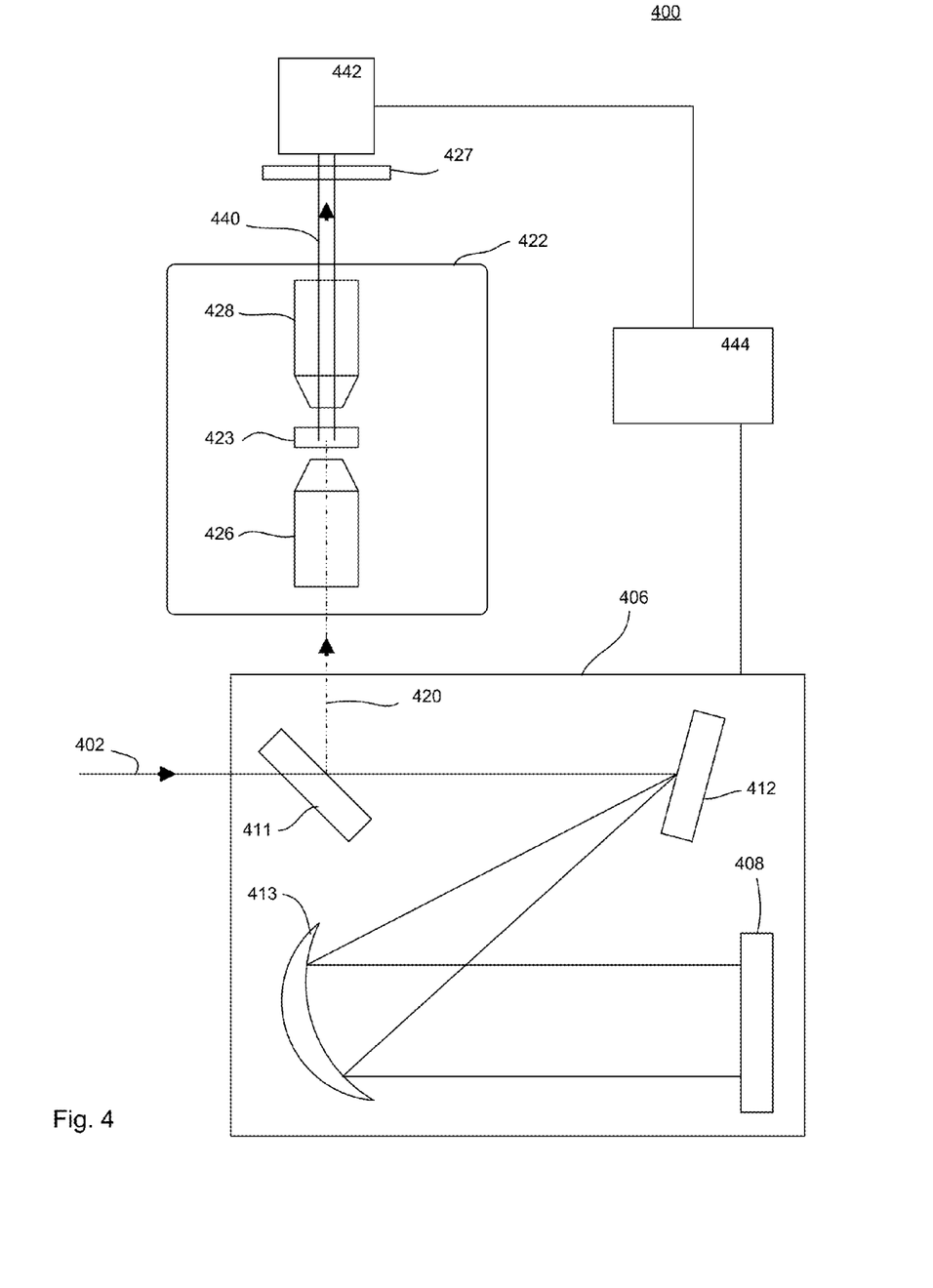
FIG. 4 is a block diagram of an exemplary parallel spectral phase modulation apparatus in which a non-linear optical system includes a multi-photon fluorescence microscope for producing forward-propagating fluorescence signal.

In some implementations, the spatial light modulator system 106 is a 4f pulse shaper, such as shown in FIGS. 2-4.

The spatial light modulator 108 can be a reflective device or a transmissive device. The spatial light modulator 108 includes a matrix (which can be a one-dimensional or two-dimensional arrangement) of phase elements, in which each element is configured to modulate the spectral phase of the optical pulse at a specific wavelength. During modulation, each phase element of the spatial light modulator 108 is dithered at a unique frequency to form transform-limited optical pulses. For a reflective spatial light modulator 108, the optical pulses 102 input to the modulator 108 are reflected from the surface of each of these elements, with at least some of spectral phases at certain wavelengths of the optical pulses 102 being modulated. The optics 110 can include optical components for steering, expanding, redirecting, reflecting, refracting the optical pulse train, and thus the optics 110 can include, for example, mirrors, which can be flat or curved, lenses, which can be convex or concave or aspheric, gratings, which can be reflective or transmissive, beam splitters, and prisms.

The spatial light modulator can be liquid-crystal based, in which the refractive index of the material of each element in the matrix changes as a fraction of applied voltage. Such liquid-crystal based spatial light modulators can be obtained from Caliper Life Sciences of Hopkinton, Mass., USA. A liquid-crystal based spatial light modulator can operate at speeds of about 60 Hz.

In other implementations, the spatial light modulator can be a micro-electromechanical system (MEMS) that uses deformable reflective optics (mirrors) to modulate the spectral phase. Such a MEMS device can be obtained from Boston Micromachines Corporation, of Cambridge, Mass., USA.

The apparatus 100 includes a non-linear optical system 122 that receives the modulated optical pulse train 120 output from the spatial light modulator system 106, and generates a non-linear optical signal 140 from the modulated optical pulse train 120. The non-linear optical signal 140 produced by the non-linear optical system 122 is input to a power detector 142. The apparatus 100 includes a control system 144 connected to the spatial light modulator 108 and to the power detector 142.

The non-linear optical signal 140 has a power Pn1 (which is measured by the power detector 142) that is proportional to an input power Pi of the optical pulse train raised to the $N^{th}$ power, where N is a number greater than 1. Thus, $Pn1=Pi^N$.

The non-linear optical signal 140 is used in the apparatus 100 because the spectral phase modulation imparted by the spatial light modulator system 106 effects the interaction between the non-linear optical system 122 and the modulated optical pulse train 120, and this effect is observable in the non-linear optical signal 140 output from the non-linear optical system 122. To put it another way, the non-linear optical signal 140 has a strong dependence on the temporal pulse duration, and therefore it will be modulated because the spectral phase modulation produced by the spatial light modulator system 106 changes the temporal pulse duration.

The non-linear optical system 122 is any system that interacts with the modulated optical pulse train 120 in a non-linear manner. The non-linear response can result in intensity-dependent variation of the propagation characteristics of the signal 140 or can create a signal 140 that propagates at a new frequency or a new direction. The non-linear optical system 122 can include solids, liquids, gases, or plasmas, and can involve one or more electromagnetic fields or internal excitations of a non-linear medium. Examples of non-linear optical systems 122 are frequency mixing systems such as second harmonic generation, third harmonic generation, or high harmonic generation. Other examples of non-linear optical systems 122 are the optical Kerr effect, optical phase conjugation, and multi-photon absorption (or fluorescence), in which two or more photons are absorbed by a sample and the energy is transferred to a single electron, which can fluoresce. Specific examples are described below with reference to FIGS. 2-4.

The power detector 142 is a device detects the power of the non-linear signal 140. Thus, for example, the power detector 142 can be a photo-diode or a photo-multiplier tube.

The control system 144 can include a programmable machine that is able to respond to instructions in a well-defined manner and can execute instructions (such as found in a program or engine internal to or external to the control system 144). The control system 144 can include electronic and digital components, including hardware needed to implement the instructions and read/access data. The control system 144 also includes a communication mechanism that is able to communicate with the power detector 142 and the system 106 or to an external network through one or more communication channels. The control system 144 can include internal memory that can store information about components of the apparatus 100.

The control system 144 can implement processes, which are described below, as executable computer program instructions stored on a computer-readable storage medium (which can be within the control system 144 or external to the control system 144). The computer-readable storage medium can be implemented as one or more types of computer-readable storage media including volatile or non-volatile memory, removable or non-removable memory, erasable or non-erasable memory, writeable or re-writeable memory, and so forth. The terms "computer-readable storage medium" and "computer-readable storage media" specifically do not consist of propagating signals and other types of transitory computer-readable media.

Referring to FIG. 2, an exemplary parallel spectral phase modulation apparatus 200 includes an ultrafast optical source 203 that produces a train of optical pulses 202 that are propagated through dispersive media 204 before being directed by a mirror 211 into a spatial light modulator system 206. The system 206 is a reflective 4f pulse shaper, and thus includes a reflective spatial light modulator 208 and optics such as a grating 212 that disperses the optical pulses 202 toward a concave mirror 213, the output of which is redirected to the modulator 208 by a mirror 214. The modulated optical pulse train 220 from the modulator 208 is directed back through the 4f pulse shaper and is directed by way of a splitter 215 toward the non-linear optical system 222. The non-linear optical signal 240 that is output from the non-linear optical system 222 is directed to a power detector 242. The apparatus 200 also includes a control system 244 that is connected to the power detector 242 and to the modulator 208.

In this example, the non-linear optical system 222 is a second harmonic generation (SHG) system in which the photons of the modulated optical pulse train 220 interact with a non-linear material 223 and are effectively "combined" to form a frequency-doubled non-linear optical signal 240, which includes new photons with twice the energy, and therefore twice the frequency and half the wavelength of the initial photons. For example, the non-linear material 223 can be a non-linear crystal material such as lithium niobate, potassium titanyl phosphate, lithium triborate, or β-barium borate (BBO). The system 222 also includes an optical splitter 224, which splits the modulated optical pulse train 220 into two paths, with one path directed to a power detector 225 and the other path directed to the non-linear material 223. The system 222 can also include other optical components for shaping and control of the modulated optical pulse train 220 such as an achromatic lens 226. Additionally, the non-linear optical signal 240 output from the non-linear material 223 can be directed through a short pass filter 227 and a plano-convex lens 228 before impinging upon the power detector 242. The short pass filter 227 can be used to block a fundamental beam and let the second harmonic generation signal 240 pass to the power detector 242.

Referring to FIG. 3, another exemplary parallel spectral phase modulation apparatus 300 is shown in which the non-linear optical system 322 is a multi-photon fluorescence system. The apparatus 300 includes a reflective spatial light modulator system 306 having a reflective spatial light modulator 308 arranged in a 4f pulse shaper. Thus, the broadened optical pulses 302 are input through an optical splitter 311 to a grating 312, which disperses the pulses 302 and redirects the dispersed pulses to a concave mirror 313, which reflects the pulses 302 toward the spatial light modulator 308. Different elements (or pixels) of the spatial light modulator 308 control different wavelengths of the optical pulses 302.

The modulated optical pulse train 320 output from the spatial light modulator 308 is directed to the non-linear optical system 322. In this example, the modulated optical pulse train 320 is directed through an optical splitter 324, through a lens 326, which focuses the light to a sample 323. The non-linear optical signal 340 emitted from the sample 323 is a multi-photon (for example, two-photon) epi-fluorescence signal, which is directed through a filter 327 toward the power detector 342. The control system 344 is connected to the power detector 342 and the spatial light modulator 308.

Referring to FIG. 4, another exemplary parallel spectral phase modulation apparatus 400 is shown in which the non-linear optical system 422 is a multi-photon fluorescence system. The apparatus 400 includes a reflective spatial light modulator system 406, which is similar to the system 306 of FIG. 3. Thus, the system 406 has a reflective spatial light modulator 408 arranged in a 4f pulse shaper. The broadened optical pulses 402 are input through an optical splitter 411 to the grating 412, which disperses the pulses 402 and redirects the dispersed pulses to the concave mirror 413, which reflects the pulses 402 toward the spatial light modulator 408. Different elements (or pixels) of the spatial light modulator 408 control different wavelengths of the optical pulses 402.

The modulated optical pulse train 420 output from the spatial light modulator 408 is directed to the non-linear optical system 422. In this example, the modulated optical pulse train 420 is directed through the lens 426, which focuses the light to the sample 423. The non-linear optical signal 440 emitted from the sample 423 is a multi-photon (for example, two-photon) forward propagating fluorescence signal, which is directed through a lens 428, and then the filter 427 toward the power detector 442. The control system 444 is connected to the power detector 442 and the spatial light modulator 408.

While a grating 212, 312, 412 is shown in the spatial light modulator system 206, 306, 406, respectively, another type of dispersive optical device such as a prism could be used. Similarly, a concave lens could be used instead of the concave mirror 213, 313, 413 of the spatial light modulator system 206, 306, 406, respectively.

Figures 5, 6:
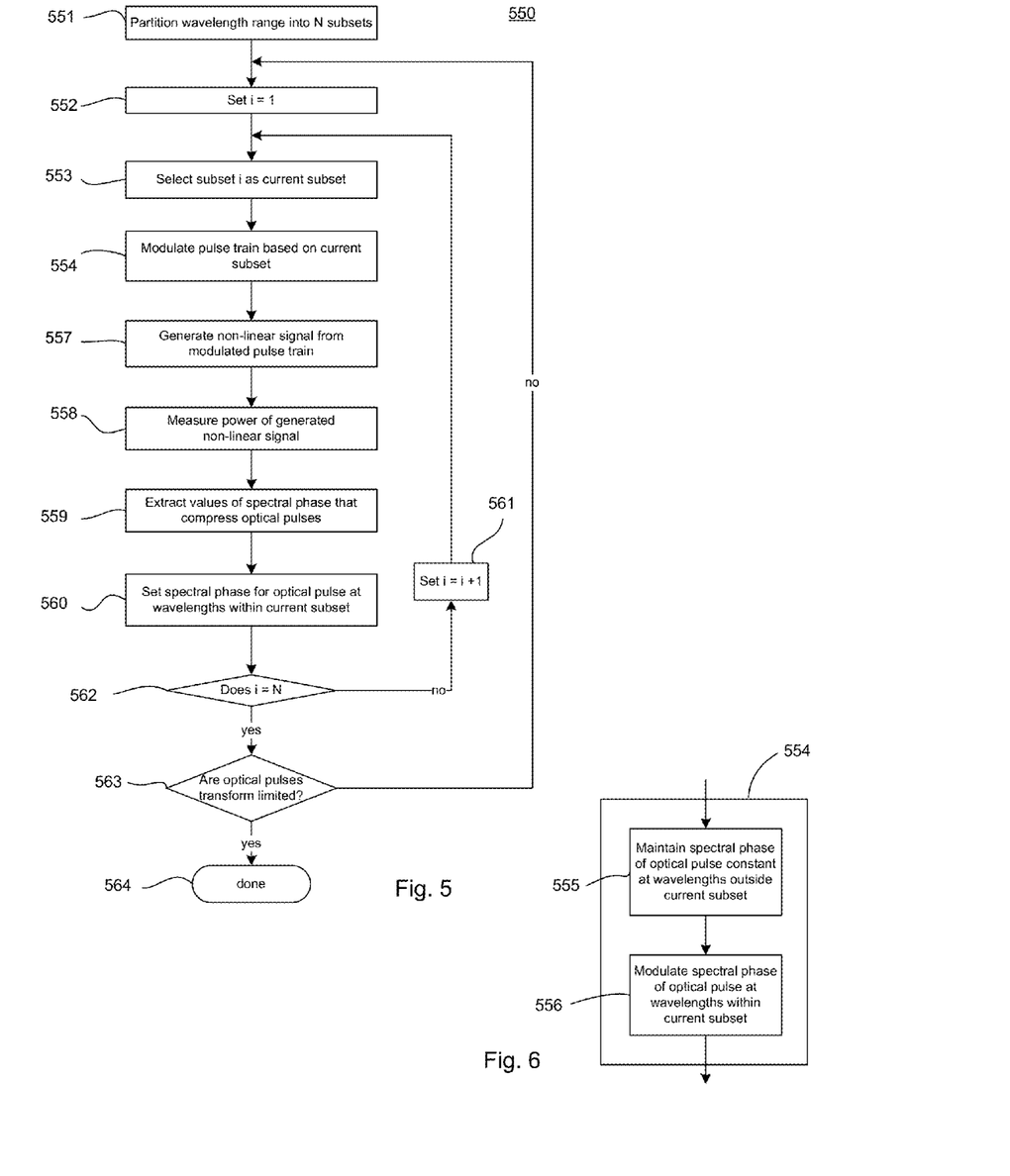
FIG. 5 is a flow chart of a procedure performed by the apparatuses of FIGS. 1-4 for compressing ultrashort optical pulses.
FIG. 6 is a flow chart of a procedure performed by the apparatuses of FIGS. 1-4 for modulating the optical pulse train based on a current wavelength range subset.

Operation of the apparatuses 100, 200, 300, and 400 is discussed next with reference to FIGS. 5 and 6.

The apparatus 100 (and also 200, 300, 400) performs a procedure 550 for compressing the ultrashort optical pulses 102 that are input to the apparatus 100. As noted above, the optical pulse 102 has a range of wavelengths and is defined by its temporal duration. Moreover, if the optical pulse 102 has been broadened by traveling through dispersive media, then the spectral phase of the optical pulse 102 has a dependence on wavelength. The procedure 550 is performed to revert the effects of the unwanted spectral phase changes that arise in the optical pulses 102. In this way, the optical pulses 102 can revert back to their transform limit, which is the lower limit for the temporal pulse duration that is possible for a given spectrum of the pulse; the transform limit is obtained when the spectral phase is wavelength-independent, or within a measurement error of being wavelength-independent. Thus, it can be considered that the pulses 102 are transform limited if they are within 5% of the wavelength (or $\lambda/20$) of the transform limit; in this case, the spectral phase is flat to within $\lambda/20$. In the examples provided below, the pulse duration is about 40 femtoseconds (fs) and the center wavelength $\lambda 0$ of the optical pulse 102 is 800 nanometers (nm).

Initially, the wavelength range of the optical pulse 102 is partitioned into a plurality of (for example, N) subsets of wavelength ranges (step 551). The partitioning step can be an automatic process performed by or through the control system 144, or it can be a manual process entered by an operator of the control system 144. In any case, the number N of subsets of wavelength ranges is selected based on the arrangement of the phase elements in the spatial light modulator 108. Thus, for example, if the spatial light modulator 108 includes 136 phase elements evenly distributed between 766 nm and 838 nm (for a wavelength range of 72 nm), then these elements can be randomly divided into four (N=4) wavelength range subsets, with each subset including 34 phase elements. As another example, if the spatial light modulator 108 includes 128 elements evenly distributed between 784.5 nm and 798.3 nm (for a wavelength range of 13.8 nm), then these elements can be randomly divided into four (N=4) wavelength range subsets, with each subset including 32 phase elements.

Next, a first (i=1) of the wavelength range subsets is selected (step 552) and that selected subset is set as the current subset (step 553). The optical pulse train is modulated based on the current wavelength range subset (step 554). The modulation of the optical pulse train is effected by the spatial light modulator 108, which receives the optical pulses 102, under control of the control system 144. As shown in FIG. 6, the modulation of the optical pulse train (step 554) includes maintaining the spectral phase of the optical pulse 102 constant at wavelengths outside the current wavelength range subset (step 555) and modulating the spectral phase of the optical pulse 102 at wavelengths within the current wavelength range subset (step 556). Basically, in step 556, the current subset of phase elements of the spatial light modulator 108 are modulated, while in step 555, all the other phase elements of the spatial light modulator 108 are kept stationary.

The modulated optical pulse train 120 is directed through the non-linear optical system 122, which generates the non-linear optical signal 140 (step 557). For example, in the apparatus 200 of FIG. 2, the second harmonic generation 240 is generated; in the apparatus 300 of FIG. 3, the multi-photon epi-fluorescence 340 is generated; and in the apparatus 400 of FIG. 4, the multi-photon forward propagating fluorescence 440 is generated.

Next, the power of the generated non-linear optical signal 140 is measured (step 558), for example, by the power detector 142. In some implementations, the power of the non-linear optical signal 140 can be measured (step 558) by Fourier transforming the measured power.

The control system 144 receives the measured power information from the power detector 142, and extracts values of the spectral phase for the optical pulse 102 at wavelengths within the current wavelength range subset based on the measured power, the values extracted being those that compress the optical pulses 102 (step 559). If the measured power is Fourier transformed (step 558), then the values that are extracted at step 559 can be extracted from this Fourier transformed data.

The control system 144 sets the spectral phase for the optical pulse 102 at wavelengths within the current wavelength range subset based on the extracted vales of the spectral phase that compress the optical pulses (as determined at step 559) (step 560).

Once the spectral phase for the optical pulse 102 is set for the wavelengths within the current wavelength range subset (step 560), then the procedure 550 determines if the selected subset (at step 553) is the last wavelength range subset of the partition (step 562). If it isn't, then the next wavelength range subset is selected (step 561) by iteration (i=i+1) and the selected subset is then set as the current subset (step 553). Thus, each of the steps 554-561 are performed iteratively until it is determined at step 562 that the selected subset (step 553) is the last (for example, i=N) wavelength range subset of the partition. In this case, each wavelength range subset of the entire wavelength range will have been phase modulated for each run through the steps of the procedure 550.

Next, it is determines if the optical pulse 102 of the optical pulse train has been compressed to a duration that is within the acceptable range (for example, within $\lambda/20$) of the transform-limited duration (step 563). It is possible that this condition is met after only one pass through each wavelength range subset of the partition. But, more passes may be needed, depending on the number of partitions, the number of phase elements of the spatial light modulator 108, or the dispersion within the optical pulses 102.

If it is determined that the optical pulse 102 is not yet compressed enough (step 563), then the procedure 550 selects a first (i=1) of the wavelength range subsets (step 552) and that selected subset is set as the current subset (step 553), with the steps 554-562 repeated until it is determined at step 563 that the optical pulse 102 has been compressed to within an acceptable range (for example, within $\lambda/20$) of its transform limit. At this point, the procedure 550 is completed (step 564).

Simulations of the apparatus 100 were performed using the procedure 550; the results of these simulations are shown in exemplary graphs of FIGS. 7A-7L.

Figure 7A:
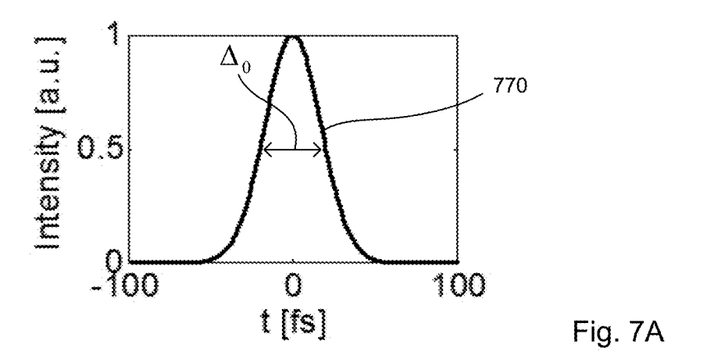
FIG. 7A is a graph of the intensity of a transform-limited optical pulse versus time.
Figure 7B:
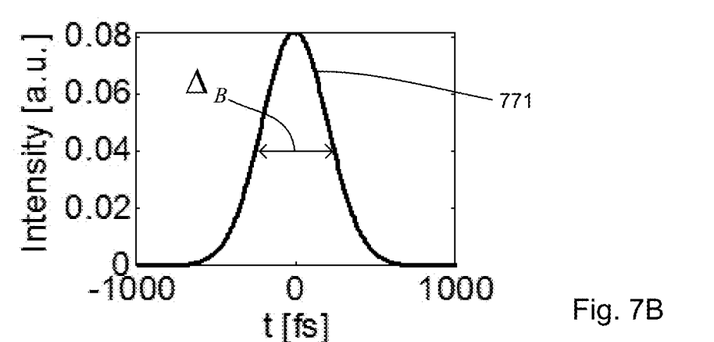
FIG. 7B is a graph of the intensity of a dispersed optical pulse versus time.

In FIG. 7A, a graph 770 of the intensity (in arbitrary units) of a transform-limited optical pulse 102 versus time (in fs) is shown. The pulse duration $\Delta_0$ of the transform-limited optical pulse 102 is determined using a suitable metric such as the full width at a percentage (50%) of the maximum; in this example, the pulse duration $\Delta_0$ is 40 fs, and the center wavelength $\lambda 0$ is 800 nm. The optical pulse 102 is Fourier transformed to the spectral domain, and then a group delay dispersion of 7000 fs$^2$ is added. The optical pulse is chirped to a broadened duration $\Delta_B$ of about 500 fs; FIG. 7B shows a graph 771 of the intensity (in arbitrary units) of this chirped pulse versus time (in fs). The broadening of the duration of the optical pulse is evident when comparing the FIG. 7B with FIG. 7A.

Figure 7C:
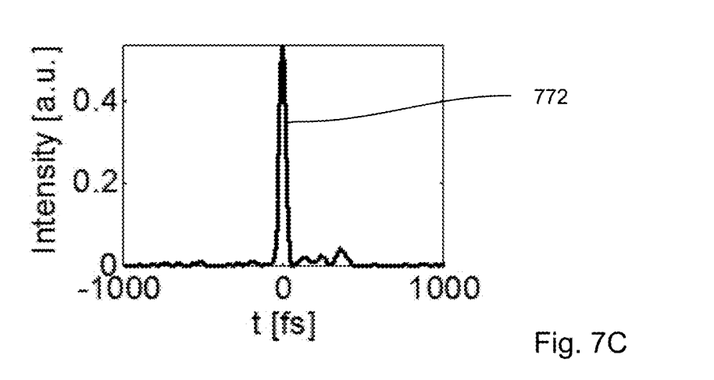
FIG. 7C is a graph of the intensity of the optical pulse versus time after a first round of the procedure of FIGS. 5 and 6 is performed on the dispersed optical pulse of FIG. 7B.
Figure 7D:
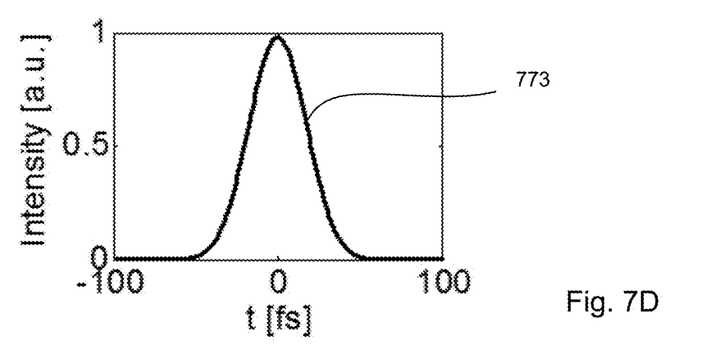
FIG. 7D is a graph of the intensity of the optical pulse versus time after a second round of the procedure of FIGS. 5 and 6 is performed on the dispersed optical pulse of FIG. 7B.
Figure 7E:
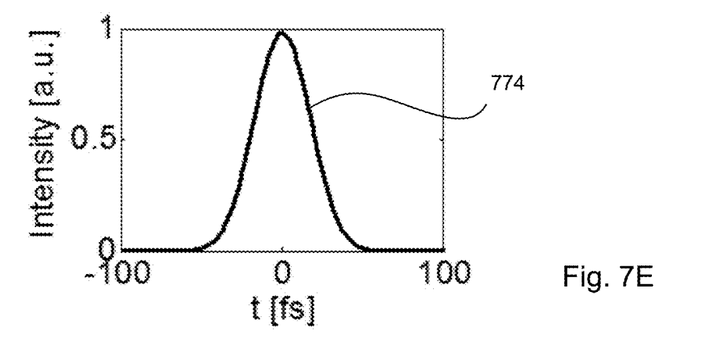
FIG. 7E is a graph of the intensity of the optical pulse versus time after a third round of the procedure of FIGS. 5 and 6 is performed on the dispersed optical pulse of FIG. 7B.

In FIG. 7C, a graph 772 of the intensity (in arbitrary units) versus time (in fs) of the optical pulse is shown after performing the procedure 550 (through step 562) once so that all of the wavelength range subsets of the partition have been modulated (steps 553-562). As shown in graph 772, the peak intensity of the optical pulse has reached about 50% of its transform limited value (which is shown in graph 770 of FIG. 7A). FIG. 7D shows a graph 773 of the intensity of the optical pulse versus time after the procedure 550 is performed (through step 562) for all wavelength range subsets of the partition a second time; and FIG. 7E shows a graph 774 of the intensity of the optical pulse versus time after the procedure 550 is performed (through step 562) for all wavelength range subsets of the partition a third time.

Figure 7F:
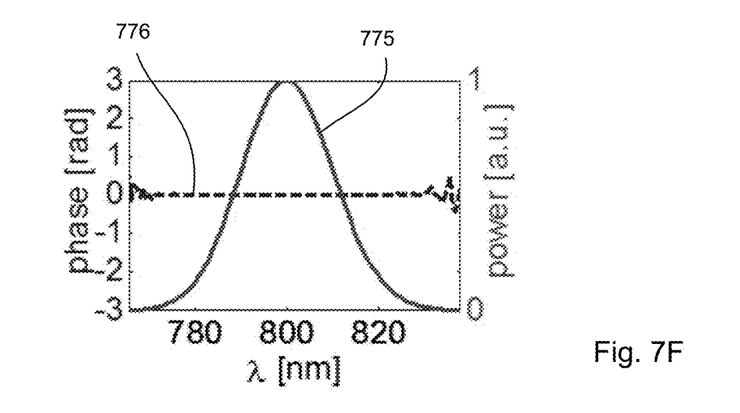
FIG. 7F is a graph of a power spectrum of the optical pulse and a phase residual of the optical pulse of FIG. 7E after three rounds of the procedure of FIGS. 5 and 6.
Figure 7G:
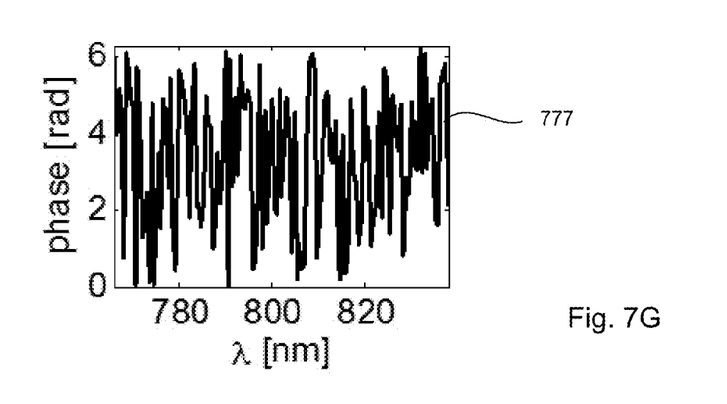
FIG. 7G is a graph of a random phase distortion versus wavelength (in nm) that is applied to a transform-limited optical pulse such as that of FIG. 7A.

FIG. 7F shows a graph 775 of the power (in arbitrary units) versus wavelength (in nm) after the procedure 550 has been performed for all wavelength range subsets of the partition the third time. The graph 775 shows the spectrum of the optical pulses 102 as measured by a spectrometer and is only shown here to demonstrate the results and benefits of the procedure 550. It is not necessary to measure the spectrum of the optical pulses 102 during any step of the procedure 550 and it is not necessary to measure or analyze the spectrum of the optical pulses 102 in order to compress the optical pulses 102 using the procedure 550 or the apparatus 100. FIG. 7F also shows a graph 776 of the difference between the spectral phase of the optical pulse that has been compensated (compressed) using the procedure 550 and the apparatus 100 and the spectral phase of the transform-limited pulse. If this difference were exactly zero, then the compressed optical pulse can be considered transform-limited. However, the procedure 550 ends (step 564) when it is determined in step 563 that this difference is below an acceptable error (for example, $\lambda/20$); because when the difference is this low, the compressed optical pulse is very close to being transform-limited and can be considered to be transform-limited to within a measurement error.

Figure 7H:
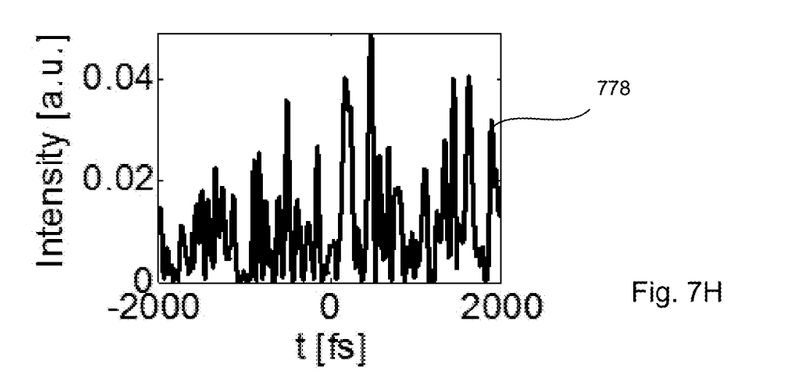
FIG. 7H is a graph of the intensity of the distorted optical pulse versus time after application of the random phase distortion of FIG. 7G to the optical pulse of FIG. 7A.
Figure 7I:
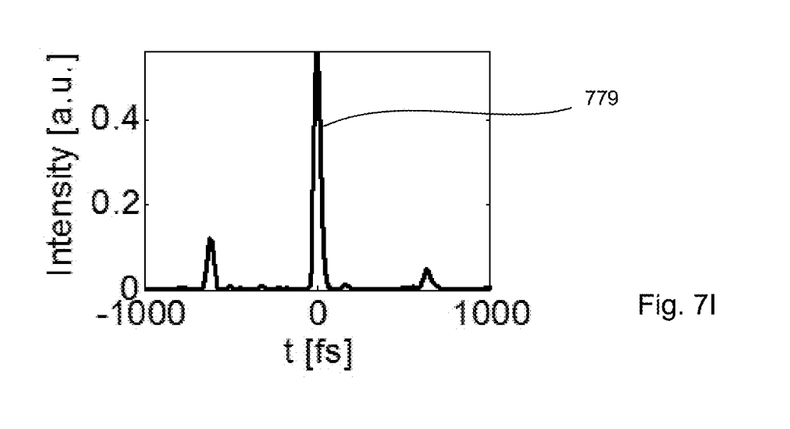
FIG. 7I is a graph of the intensity of the optical pulse versus time after a first round of the procedure of FIGS. 5 and 6 is performed on the distorted optical pulse of FIG. 7H.
Figure 7J:
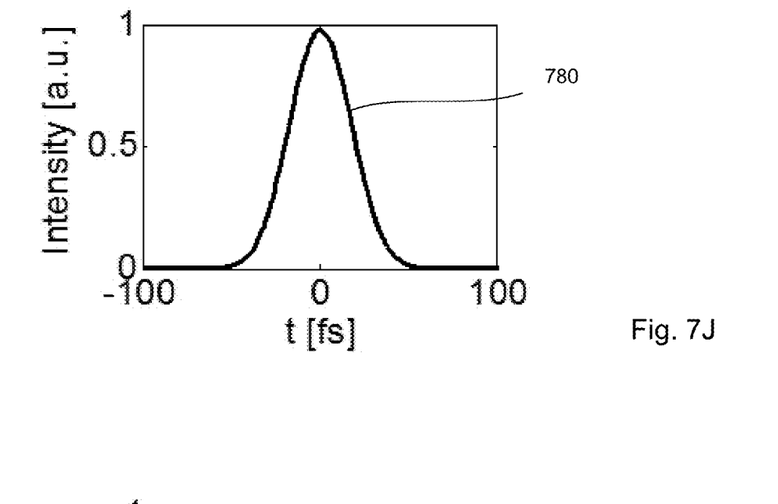
FIG. 7J is a graph of the intensity of the optical pulse versus time after a second round of the procedure of FIGS. 5 and 6 is performed on the distorted optical pulse of FIG. 7H.
Figure 7K:
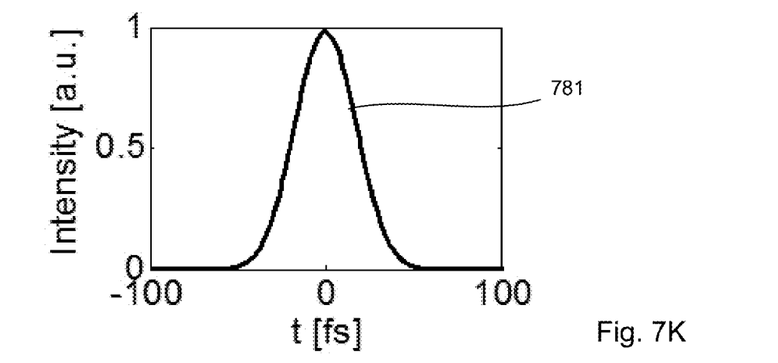
FIG. 7K is a graph of the intensity of the optical pulse versus time after a third round of the procedure of FIGS. 5 and 6 is performed on the distorted optical pulse of FIG. 7H.

FIGS. 7G-7L show results that test the performance of the apparatus 100 and the procedure 550 using a completely random phase distortion applied to the optical pulse 102. For example, in FIG. 7G, a graph 777 shows a random phase number between 0 and $2\pi$, which is assigned to the spectral phase controlled by each phase element of the spatial light modulator 108. In FIG. 7H, a graph 778 shows the intensity (in arbitrary units) of the optical pulse that has been distorted with this random phase number versus time (in fs). FIGS. 7I, 7J, and 7K show graphs 779, 780, 781, respectively, of the intensity (in arbitrary units) of the phase compensated optical pulses after one, two, and three rounds of the procedure 550.

Figure 7L:
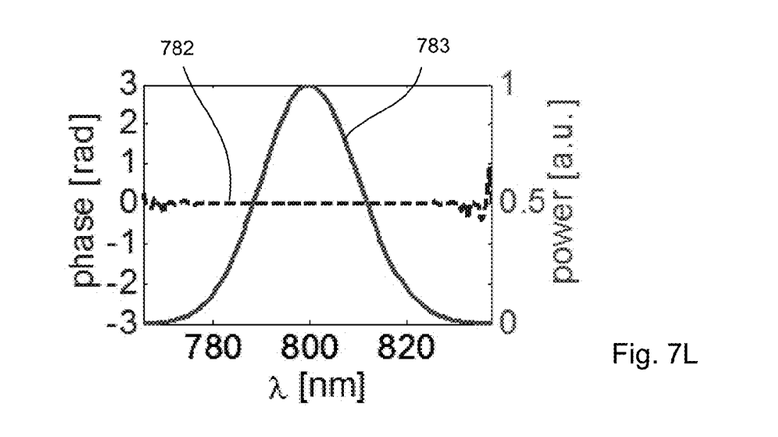
FIG. 7L is a graph of a power spectrum of the optical pulse and a phase residual of the optical pulse of FIG. 7K after three rounds of the procedure of FIGS. 5 and 6.

FIG. 7L shows a graph 782 of the power (in arbitrary units) versus wavelength (in nm) after the round of the procedure 550 (in which the steps 553-562 have been performed for all wavelength range subsets of the partition three times). The graph 782 shows the spectrum of the optical pulses 102 as measured by a spectrometer that isn't a part of the apparatus 100, and thus, this graph is only shown here to demonstrate the results and benefits of the procedure 550, even on a randomly-distorted optical pulse. FIG. 7L also shows a graph 783 of the difference between the spectral phase of the optical pulse that has been compensated (compressed) using the procedure 550 and the apparatus 100, and the spectral phase of the transform-limited pulse (the pulse prior to the addition of the random distortions). If this difference were exactly zero, then the compressed optical pulse can be considered to be transform-limited. However, the procedure 550 ends (step 564) when it is determined in step 563 that this difference is below an acceptable error (for example, $\lambda/20$); because when the difference is this low, the compressed optical pulse is very close to being transform-limited and can be considered to be transform-limited to within a measurement error.

Referring to FIGS. 8A-8F, the performance of the procedure 550 applied to the system 200 is shown. In these examples, a smooth spectral phase distortion is applied by the dispersive media 204, which, in this example, is a prism pair compressor configured to provide minimum negative dispersion.

Figure 8A:
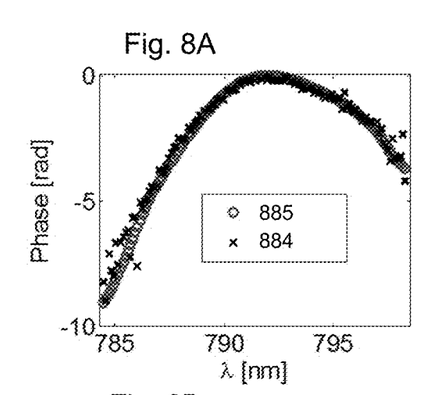
FIG. 8A is a graph of a spectral compensation phase profile of an optical pulse versus time after three rounds of the procedure of FIGS. 5 and 6 is applied to an optical pulse using the apparatus of FIG. 2 and a graph of a spectral compensation phase profile of an optical pulse versus time determined using multiphoton intrapulse interference phase scan measurements.

FIG. 8A shows a graph 884 of the spectral compensation phase profile determined after three rounds of the procedure 550 (dark cross). FIG. 8A also shows a graph 885 of the spectral compensation phase profile, for comparison purposes only, of the results of a pulse shaper system that uses a spectrometer that provides the spectrum from second harmonic generation to a controller of the pulse shaper system.

Figure 8B:
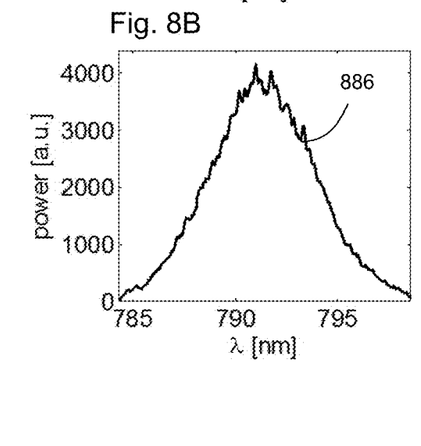
FIG. 8B is a graph of a power spectrum of an optical source of FIG. 2.

For reference only, FIG. 8B shows a graph 886 of the power spectrum of the ultrafast optical source 203.

To study the performance of the apparatus 200 and the procedure 550 with completely random spectral phase distortions, the same prism pair compressor configuration (204) as in the previous measurement is used, and a random number between 0 and $2\pi$ is added to every phase element of the spatial light modulator 208. This random phase distortion was included in all of the modulation phase patterns during the measurements such that the single spatial light modulator array of phase elements behaves as two independent arrays of phase elements; one phase element array providing the distortion and the other phase element array implementing the measurement and procedure 550.

Figure 8C:
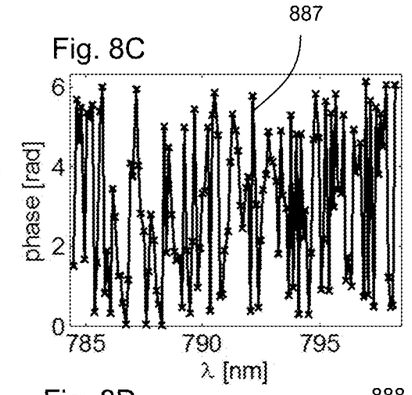
FIG. 8C is a graph of a random phase distortion versus wavelength (in nm) that is applied to an optical pulse produced from the optical source of FIG. 2 and dispersed by the dispersive medium of FIG. 2.
Figure 8D:
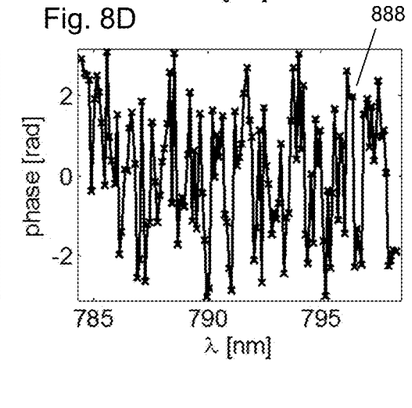
FIG. 8D is a graph of a spectral compensation phase profile of the optical pulse versus time after application of the random phase distortion shown in FIG. 8C to the optical pulse of FIG. 2.
Figure 8E:
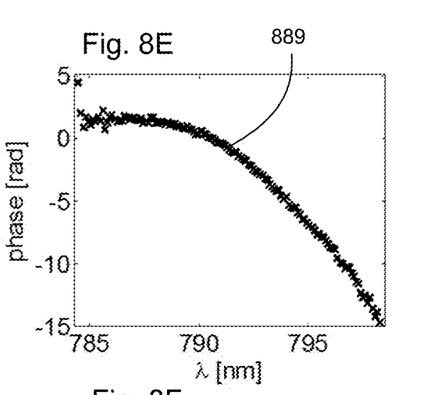
FIG. 8E is a graph of an unwrapped summation of the phase profile of FIG. 8C and the phase profile of FIG. 8D versus wavelength (in nm)
Figure 8F:
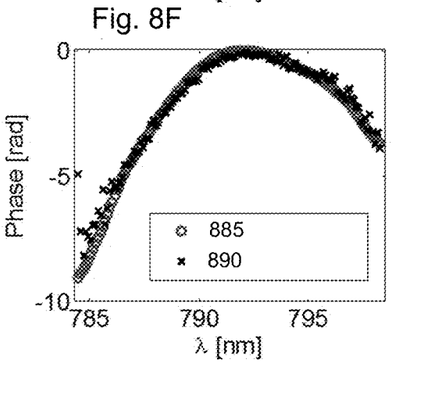
FIG. 8F is a graph of the spectral compensation phase profile of the optical pulse versus time determined using multiphoton intrapulse interference phase scan measurements in FIG. 8A and the phase profile of FIG. 8E with their $0^{th}$ and $1^{st}$ order phase differences removed.

The added random phase distortion profile 887 and the determined phase compensation profile 888 are shown, respectively, in FIGS. 8C and 8D. The two phase profiles were summed and then unwrapped, as shown in the graph 889 of FIG. 8E. The phase profile determined after using the procedure 550 should compensate for not only the added random distortion but also the existing smooth distortion. To verify this point, FIG. 8F shows the graph 885 superimposed with a graph 890 of the phase profile of FIG. 8E in which the $0^{th}$ order and $1^{st}$ order phase differences have been removed.

The generated power (the non-linear optical signal 240) from the second harmonic generation is about 2.20±0.01 a.u. for the compensation profile 884 and about 2.22±0.01 a.u. for the phase profile 889. Without the compensation profile, the second harmonic generation (non-linear optical signal 240) was 0.90±0.01 a.u. and with the additional random phase distortion, the second harmonic generation (non-linear optical signal 240) was 0.062±0.001 a.u.

The apparatus 100 and the procedure 550 determine the spectral phase profile of ultrafast optical pulses through interferometric spectral domain modulation. In the implementations discussed above, each measurement step can take 100 ms, and 512 measurements can be used for one round of the procedure 550 through step 562. It is evident from the examples provided herein, that three rounds of the procedure 550 through step 562 are sufficient to compensate for phase distortions that are smooth or completely random.

The apparatus 100 and the procedure 550 do not require a measurement of the coherent non-linear spectrum. Even incoherent signals such as multi-photon fluorescence (as in FIGS. 3 and 4) can be used for pulse compression. Thus, the apparatus 100 and the procedure 550 can be combined with multi-photon microscopy (as in FIGS. 3 and 4) to directly use the non-linear signal, for example two-photon fluorescence, measured by a power detector to determine and compensate for spectral phase distortion. Thus, the apparatus 100 and the procedure 550 enable a deterministic phase measurement and is significantly faster than those techniques that require measurements of the non-linear spectrum. The apparatus 100, and the procedure 550, make no assumption of the profile of the distorted phase.

Other implementations are within the scope of the following claims.

What is claimed is:

1. A method for compressing ultrashort optical pulses of a train, the optical pulses having a range of wavelengths, the method comprising:
partitioning the wavelength range into a plurality of subsets of wavelength ranges;
selecting one of the wavelength range subsets as the current wavelength range subset;
modulating the optical pulse train based on the current wavelength range subset by:
maintaining the spectral phase of the optical pulse constant at wavelengths outside the current wavelength range subset; and
modulating the spectral phase of the optical pulse at wavelengths within the current wavelength range subset;
generating a non-linear optical signal from the modulated optical pulse train by directing the modulated optical pulse train through a non-linear optical system;
measuring the power of the generated non-linear optical signal; and
based on the measured power, extracting values of the spectral phase for the optical pulse at wavelengths within the current wavelength range subset, the values extracted being those that compress the optical pulses.

2. The method of claim 1, further comprising setting the spectral phase for the optical pulse at wavelengths within the current wavelength range subset based on the extracted values of the spectral phase that compress the optical pulses.

3. The method of claim 2, further comprising:
determining whether the optical pulses have been compressed to within an acceptable range of a transform limited duration.

4. The method of claim 3, wherein the optical pulses are compressed to within the acceptable range of the transform limited duration if the spectral phase is independent of the wavelength to within 5% of the wavelength.

5. The method of claim 2, further comprising:
after setting the spectral phase for the optical pulse at wavelengths within the current wavelength range subset, determining if any of the wavelength ranges of the partition have not yet been selected as the current wavelength range subset;
if a particular wavelength range subset of the partition has not yet been selected as the current wavelength range subset, then selecting the particular wavelength range subset as the current wavelength range subset;
modulating the optical pulse train based on the current wavelength range subset;
generating the non-linear optical signal from the modulated optical pulse train by directing the modulated optical pulse train through the non-linear optical system;
measuring the power of the generated non-linear optical signal; and
based on the measured power, extracting values of the spectral phase for the optical pulse at wavelengths within the current wavelength range subset, the values extracted being those that compress the optical pulses.

6. The method of claim 5, further comprising setting the spectral phase for the optical pulse at wavelengths within the current wavelength range subset based on the extracted values of the spectral phase that compress the optical pulses.

7. The method of claim 1, wherein directing the modulated optical pulse train through the non-linear optical system comprises directing the modulated optical pulse train through a non-linear medium.

8. The method of claim 7, wherein:
generating the non-linear optical signal comprises generating a second harmonic generation of the modulated optical pulse train after it passes through the non-linear optical medium; and
measuring the power of the generated non-linear optical signal comprises measuring the power of the second harmonic generation.

9. The method of claim 1, wherein directing the modulated optical pulse train through the non-linear optical system comprises directing the modulated optical pulse train through a multi-photon fluorescence microscope toward a sample.

10. The method of claim 9, wherein:
generating the non-linear optical signal from the modulated optical pulse train comprises generating multi-photon fluorescence from the sample due to a multi-photon interaction of the modulated optical pulse train with the sample; and
measuring the power of the generated non-linear optical signal comprises measuring the power of the multi-photon fluorescence.

11. The method of claim 1, wherein:
measuring the power of the generated non-linear optical signal comprises Fourier transforming the measured power; and
extracting values of the spectral phase for the optical pulse at wavelengths within the current wavelength range subset comprises extracting the values of the spectral phase from the Fourier transformed data.

12. The method of claim 1, wherein extracting the values comprises extracting the values without analyzing the spectrum of the generated non-linear optical signal.

13. The method of claim 1, wherein modulating the spectral phase of the optical pulse at wavelengths within the current wavelength range subset comprises modulating the optical pulse at each wavelength within the current wavelength range subset at a distinct frequency.

14. The method of claim 1, wherein partitioning the wavelength range into a plurality of subsets of wavelength ranges comprises partitioning the wavelength range into at least three subsets of wavelength ranges.

15. An apparatus for compressing ultrashort optical pulses of an optical pulse train, the optical pulses having a range of wavelengths, the apparatus comprising:
a spatial light modulator configured to:
receive the optical pulse train; and
output the modulated optical pulse train;
a non-linear optical system that receives the modulated optical pulse train output from the spatial light modulator and is configured to generate a non-linear optical signal from the modulated optical pulse train;
a power detector that detects a power of the generated non-linear optical signal; and
a control system connected to the spatial light modulator and to the power detector, and configured to:
partition the wavelength range of the optical pulse into a plurality of subsets of wavelength ranges;
select a wavelength range subset from the partition as the current wavelength range subset;

output a signal to the spatial light modulator to cause the spatial light modulator to modulate optical pulse train by modulating the spectral phase of the optical pulse at wavelengths within the current wavelength range subset and maintaining the spectral phase of the optical pulse constant at wavelengths outside the current wavelength range subset;

receive the detected power from the power detector; and based on the measured power, extract values of the spectral phase for the optical pulse at wavelengths within the current wavelength range subset, the values extracted being those that compress the optical pulses.

16. The apparatus of claim 15, wherein the control system is configured to set the spectral phase for the optical pulse at wavelengths within the current wavelength range subset based on the extracted values of the spectral phase that compress the optical pulses.

17. The apparatus of claim 16, wherein the control system is configured to determine whether the optical pulses have been compressed to a transform limited duration.

18. The apparatus of claim 15, wherein the non-linear optical system comprises a non-linear medium.

19. The apparatus of claim 18, wherein the generated non-linear optical signal comprises the second harmonic generation signal generated from the non-linear medium.

20. The apparatus of claim 15, wherein the non-linear optical system comprises a multi-photon fluorescence microscope.

21. The apparatus of claim 20, wherein the generated non-linear optical signal comprises the multi-photon fluorescence output from the sample due to a multi-photon interaction of the modulated optical pulse train with the sample.

22. A method for compressing ultrashort optical pulses of an optical pulse train, the optical pulses having a range of wavelengths, the method comprising:

partitioning the wavelength range into a plurality of subsets of wavelength ranges;

for each wavelength range subset of the partition:
  A. selecting the wavelength range subset as a current wavelength range subset;
  B. modulating the optical pulse train based on the current wavelength range subset by maintaining the spectral phase of the optical pulse constant at wavelengths outside the current wavelength range subset and modulating the spectral phase of the optical pulse at wavelengths within the current wavelength range subset;
  C. generating a non-linear optical signal from the modulated optical pulse train by directing the modulated optical pulse train through a non-linear optical system;
  D. measuring the power of the generated non-linear optical signal;
  E. based on the measured power, extracting values of the spectral phase for the optical pulse at wavelengths within the current wavelength range subset, the values extracted being those that compress the optical pulses; and
  F. setting the spectral phase for the optical pulse at wavelengths within the current wavelength range subset based on the extracted values of the spectral phase that compress the optical pulses; and repeating steps A-F until the optical pulses of the optical pulse train have been compressed to a duration that is within the acceptable range of the transform-limited duration.

* * * * *